HUBLER & McGRATH.
Corn Sheller.

No. 35,757. Patented July 1, 1862.

Witnesses:
T. Smith
Geo. Colambright

Inventors:
J. Hubler
R. M. McGrath

UNITED STATES PATENT OFFICE.

JOSEPH HUBLER AND ROBERT M. McGRATH, OF LAFAYETTE, INDIANA.

IMPROVEMENT IN CORN SHELLERS AND CLEANERS.

Specification forming part of Letters Patent No. 35,757, dated July 1, 1862.

*To all whom it may concern:*

Be it known that we, JOSEPH HUBLER and ROBERT M. McGRATH, of Lafayette, in the county of Tippecanoe and State of Indiana, have invented a certain new and useful Improvement in Corn Shellers and Cleaners; and we do hereby declare that the following is a full, clear, and exact description thereof, reference being had to the accompanying drawings, and to the letters and marks thereon.

On the 25th day of September, 1860, a patent was granted to Richards, Hubler & McGrath, assignees of J. C. Richards, for certain improvements on corn shellers and cleaners. The invention of this application is an improvement on the machine of the patent here alluded to.

By the drawings forming part of this specification is shown the corn sheller and cleaner of the patent with the improvement that is made the subject of this application added thereto.

Figure 1:
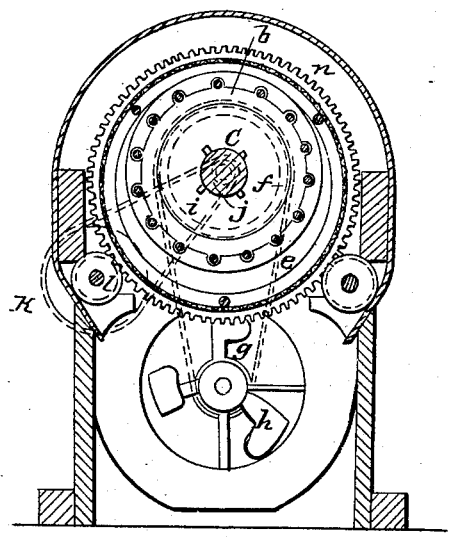
Figure 2:
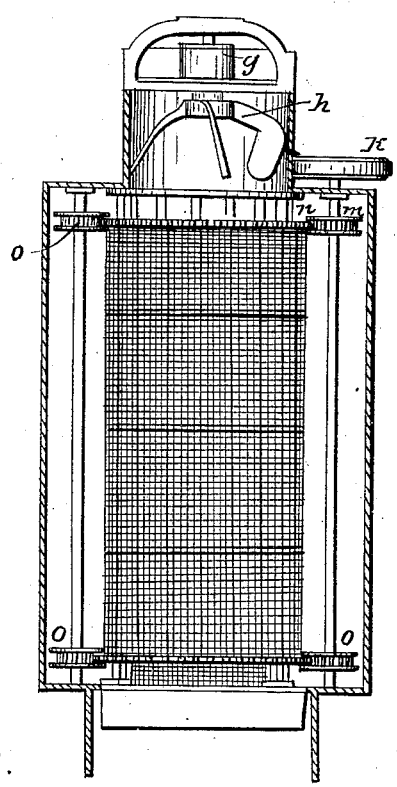
Figure 3:
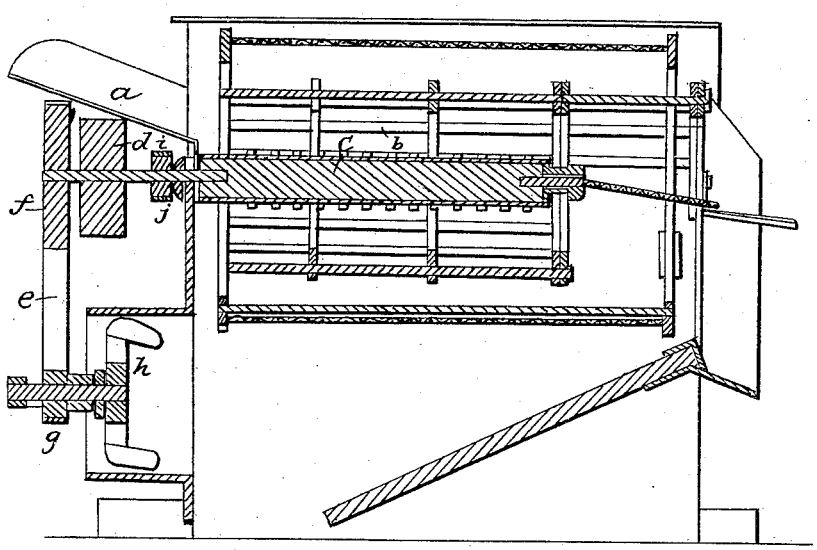

Figure 1 of the drawings represents the machine by an end view with the end plate and chute removed, Fig. 2 being a bottom view, the shell or covering-plate of the machine being off, and Fig. 3 being a view by longitudinal section of the machine.

In each of the figures where like parts are shown like marks and letters are used to indicate the parts.

In this machine the ears of corn, by a chute, $a$, are fed into a cylinder made up of rods $b$, within which, by the rotation of a toothed shaft, $c$, the corn is shelled from the cob. The rod-cylinder $b$ is surrounded by the cleaning-cylinder, which is indicated in the figures of the drawings by blue coloring.

The machine has suitable covering and supports, and can be put in motion by a band being passed around the wheel or drum $d$ on the shaft $c$, the band coming from any machine of motive power. A band, $e$, around wheel or pulley $f$ and drum $g$, transmits motion to the fan-blower $h$, while another band, $i$, around wheels or pulleys $j$ and $k$, transmits motion to the shaft $l$, which, by its toothed wheel $m$, meshing into the rim $n$ of the cleaner, gives rotation to the cleaner. The cleaner is supported by grooved wheels or rollers $o\ o\ o$.

As set forth in the Letters Patent heretofore alluded to, the rod-cylinder or sheller and the screen-cylinder or cleaner were of the same length. Experience in the use of the machine has shown this condition and relation of the two cylinders to be a defect. The shelling being done the whole length of the cleaner, the corn that was shelled and dropped through the back end was either caught by the wind from the fan and blown over with the chaff, or by a reduced blast permitted to carry chaff and other impurities with it into the clean corn. Then if we produced clean corn we made a large amount of litter at the tail end, which had to be put through the machine again, occasioning extra labor and inconvenience; also, when the broken cobs, which are always moved with these tailings, go through the sheller once or more they get broken so fine that they pass through the meshes of the tailing-screen, and thus pass out with the clean corn. The object of the improvement of this application is to remedy the defect here named; and our invention therefore consists, as is shown by the drawings, in making the sheller shorter than the cleaner, or, in other words, in having the screen-cylinder or cleaner longer than the rod-cylinder or sheller, so that the corn that is shelled at the back end of the sheller can receive a strong blast of wind and be freed from chaff and other impurities before it reaches the back end of the cleaner.

For the peculiarities of construction of the sheller and the other parts of the machine, except the special relation of the sheller and cleaner, which is here named as the improvement, reference is made to the patent of the 25th of September, 1860, heretofore alluded to.

What we claim as our invention, and desire to secure by Letters Patent, is—

An improvement on machines for shelling and cleaning corn wherein a rod-cylinder and toothed shaft and screen-cylinder are used, substantially as covered by the patent to Richards, Hubler & McGrath of the 25th of September, 1860, is making the sheller shorter than the cleaner, or, in other words, in having the screen-cylinder or cleaner longer than the rod-cylinder or sheller, as herein set forth.

This specification signed this 17th day of May, A. D. 1862.

J. HUBLER.
R. M. McGRATH.

Witnesses:
JOHN S. ALLEN,
JOHN CRONIN.